Figure 1:
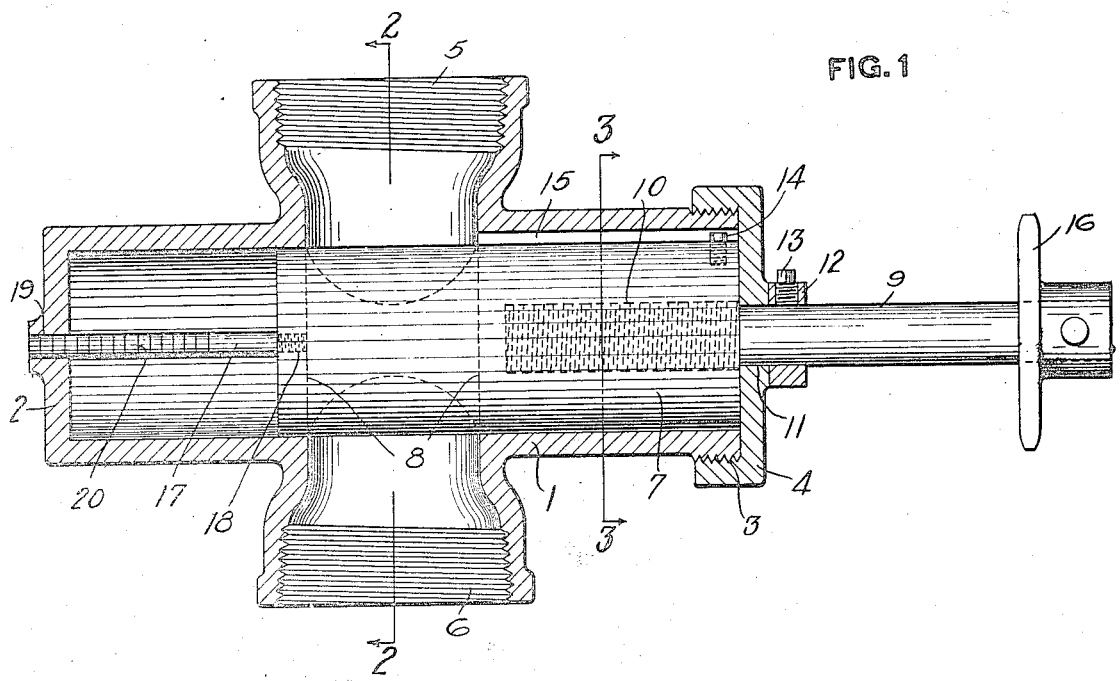

W. E. STANDLEY.
VALVE FOR GLASS BLOWING MACHINES.
APPLICATION FILED JULY 7, 1915.

1,182,878.

Patented May 9, 1916.

WITNESSES

INVENTOR
William E. Standley

UNITED STATES PATENT OFFICE.

WILLIAM E. STANDLEY, OF PITTSBURGH, PENNSYLVANIA.

VALVE FOR GLASS-BLOWING MACHINES.

1,182,878. Specification of Letters Patent. Patented May 9, 1916.

Application filed July 7, 1915. Serial No. 38,522.

*To all whom it may concern:*

Be it known that I, WILLIAM E. STANDLEY, resident of Pittsburgh, in the county of Allegheny and State of Pennsylvania, have invented a new and useful Improvement in Valves for Glass-Blowing Machines, of which the following is a specification.

This invention relates to an air regulating valve for glass blowing machines.

As is well known the machine method of forming window glass is to draw the molten glass into large cylinders and thereafter split the same and flatten them out in ovens into flat sheets. In the method of forming window glass for use in which this valve is particularly designed, a drawing head or bait is lowered into a receptacle containing the molten glass and is slowly raised therefrom to form a glass cylinder. In order to keep this cylinder from collapsing during the drawing operation it is necessary that air be supplied to the interior of the cylinder for the purpose of maintaining its form. Since the drawing operation is very slow it is necessary that air be supplied continuously during the operation to fill the interior of the cylinder as it is formed and also that the air pressure within the cylinder be maintained constant in order that the cylinder may be of uniform diameter throughout its length and constrictions or bulges therein prevented. It is of particular importance that this air supply be constant in order to form a cylinder of uniform diameter and wall thickness, since in flattening the glass after splitting of the cylinder bulges or constrictions in the cylinder are objectionable preventing the formation of a sheet which is uniform in thickness and in horizontal extent. In order that the air pressure within the cylinder during its formation be maintained uniform at all times and in all portions of the cylinder it is necessary that a valve be provided which is capable of admitting the full amount of air necessary and which is at the same time so sensitive that the amount of air admitted to the interior of the cylinder at any particular moment may be accurately graduated.

The object of the present invention is to provide a valve for use with a glass blowing machine which will supply a nicely graduated amount of air to the interior of the cylinder through a convenient connection, preferably through the cylinder forming bait.

A further object of the invention is to provide indicating means in connection with such valve so that the operator may be able to observe at any particular moment how great a volume of air is passing into the interior of the glass cylinder.

The invention comprises the construction and arrangement of parts as hereinafter described and claimed.

Figure 2:
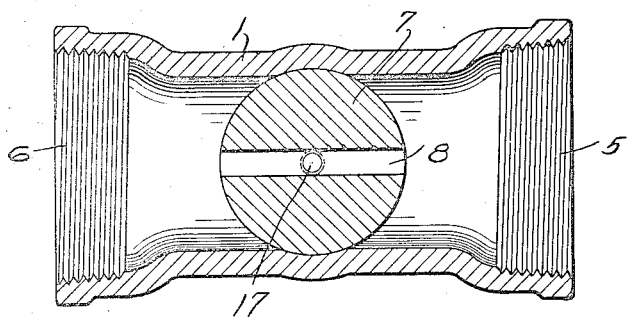
Figure 3:
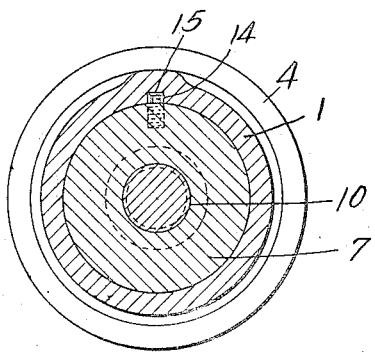

In the accompanying drawings, Figure 1 is a central vertical section through the valve; Fig. 2 is a transverse section through the same on the line 2—2, Fig. 1; and Fig. 3 is a transverse section on the line 3—3, Fig. 1.

The operating parts of the valve are mounted in a casing 1 which is cast solid at one end 2 and at the other end is screw threaded, as at 3, to afford engagement with a screw threaded cap 4. Between its ends the side walls of casing are provided with an air inlet 5 and an air outlet 6 from which any suitable connection may be made to the cylinder drawing bait of the glass blowing machine. Seated in the casing 1 and having a close sliding engagement therein is the plug or valve body 7 which is provided with a slot 8 extending transversely therethrough and extending longitudinally thereof and being of uniform width from end to end and being arranged to register more or less with the inlet and outlet passages 5 and 6 of the valve casing in different positions of the valve body 7.

In order to move the valve body 7 longitudinally in the casing 1 an actuating rod 9 is rotatably mounted in the cap 4 of the casing and has a screw threaded portion 10 engaging in a screw threaded bore in the body 7. The diameter of the screw threaded portion of the rod 9 is slightly greater than that of the aperture 11 in the cap 4 through which the rod 9 passes so that this screw threaded portion 10 prevents the rod 9 from moving outwardly, and to prevent the rod from moving inwardly a collar 12 is clamped on the rod 9, adjacent the cap 4, by means of a set screw 13 which passes therethrough and bears against the rod. The rod 9 is thus prevented from moving longitudinally of the casing in either direction so that the rotation thereof can affect only the position of the valve body 7 in the casing.

In order to convert the rotary movement of the rod into one of translation of the valve body or plug 7, the latter is provided with means for preventing its rotation relatively to the casing 1. This means comprises a stud 14 screw threaded into the valve body 7 and engaging a longitudinal groove 15 in the casing 1. Thus, when the rod 9 is rotated in one direction the body member 7 of the valve moves inwardly of the casing, while rotation of the rod in the opposite direction causes the body member 7 to move outwardly, the limit of such outward movement being illustrated in Fig. 1.

As illustrated, the rod 9 is provided with a sprocket wheel 16 arranged to be engaged by a sprocket chain from any suitable driving means, as for instance, the motor employed in raising and lowering the bait of the drawing machine. This, however, is only one of a number of possible means for rotating the actuating rod 9, since it is obvious that this rod may be rotated by any other suitable means, as by a belt or gear connection with a motor, or even by a suitable hand wheel. As illustrated in Fig. 1, the passage 8 through the valve is completely open so that the maximum supply of air is permitted to pass from supply inlet 5 through the body of the valve to the outlet 6 connected to the drawing bait of the glass blowing machine. When it is desired to decrease this supply of air the rod 9 is rotated to move the valve body inwardly the desired distance so that a certain length of the solid portion of the valve body will overlap the inlet 5 and outlet 6 of the valve, thereby decreasing the extent of the air passage through the valve.

In order that the operator of the machine may be able to determine readily the amount of air passing through the valve at any particular time, a suitable gage is provided. This comprises a graduated rod 17 having an inner screw threaded portion 18 engaging a screw threaded bore in the valve body 7 and projecting through an aperture 19 in the inner end 2 of the valve casing. When the valve is entirely open with the transverse passage 7 through the valve body in full registration with the inlet and outlet ports as shown in Fig. 1, the rod 17 does not project beyond the extremity of the valve casing, but when the valve body 7 is moved inwardly in the casing to diminish the amount of air passing therethrough, the rod 7 will project beyond the portion 2 of the casing a greater or lesser extent, depending upon the distance through which the valve body 7 is moved in the casing, and its position is indicated by the graduations 20 on the rod 17 so that a mere glance at that portion of indicating rod 17 which at the moment extends beyond the valve casing 1, will indicate to the operator the amount of air passing through the valve at that moment. The passage through the valve body is of uniform shape from end to end, so that a movement of the valve body for a certain distance, will cause a proportionate variation in the amount of air passing through to the valve.

It will be seen that the valve above described is one of great sensitivity, and one whereby the amount of air passing therethrough can be very accurately adjusted. In drawing a cylinder of glass by means of a bait the valve may be originally in the position to cut off entirely communication between the inlet 5 and outlet 6. As the cylinder is slowly drawn the rod 9 is rotated to move the valve body 7 outwardly in its casing and gradually increase the size of the communication between the inlet and outlet connections. By observing the indicating rod 17 during this operation the operator may observe at any moment whether an amount of air sufficient to fill the interior of the cylinder is being supplied to the same and may so regulate the position of the valve body 7 that constrictions or bulges will not occur in the cylinder being drawn through too small or too great an amount of air being supplied to the cylinder.

What I claim is:—

1. An air regulating valve for glass drawing and blowing machines comprising a casing provided with an inlet and an outlet and having a bore extending transversely thereto, a valve body longitudinally movable in said casing bore transversely to said inlet and outlet and provided with a transverse passage therethrough, said passage extending longitudinally of said valve body and being of uniform width from end to end and arranged to be brought into greater or lesser register with said inlet and outlet, and means for moving said body longitudinally in said casing.

2. An air regulating valve for glass drawing and blowing machines comprising a casing provided with an inlet and an outlet and having a bore extending transversely thereto, a valve body longitudinally movable in said casing bore transversely to said inlet and outlet and provided with a transverse passage therethrough, said passage extending longitudinally of said valve body and being of uniform width from end to end and arranged to be brought into greater or lesser register with said inlet and outlet, and a rotary rod having a screw threaded connection with said body and arranged by rotation thereof to move said body longitudinally in said casing.

3. An air regulating valve for glass drawing and blowing machines comprising a casing provided with an inlet and an outlet and having a bore extending transversely thereto, a valve body longitudinally movable in said casing bore transversely to said inlet and outlet and provided with a transverse passage therethrough, said passage extending longitudinally of said valve body and being of uniform width from end to end and arranged to be brought into greater or lesser register with said inlet and outlet, a rotary rod having a screw threaded connection with said body and being held against longitudinal movement relative to said casing, and means for preventing rotation of said valve body upon rotation of said rod.

4. An air regulating valve for glass drawing and blowing machines comprising a casing provided with an inlet and an outlet and having a bore extending transversely thereto, a valve body longitudinally movable in said casing bore transversely to said inlet and outlet and provided with a transverse passage therethrough, said passage extending longitudinally of said valve body and being of uniform width from end to end and arranged to be brought into greater or lesser register with said inlet and outlet, a rotary rod having a screw threaded connection with said body and being held against longitudinal movement in said casing, and a projection on said body extending onto a longitudinal groove in said casing for preventing rotation of said valve body relative to said casing upon rotation of said rod.

5. An air regulating valve for glass drawing and blowing machines comprising a casing provided with an inlet and an outlet and having a bore extending transversely thereto, a valve body longitudinally movable in said casing bore transversely to said inlet and outlet and provided with a transverse passage therethrough, said passage extending longitudinally of said valve body and being of uniform width from end to end and arranged to be brought into greater or lesser register with said inlet and outlet, means for moving said body longitudinally in said casing, and a gage connected with said body and arranged to indicate the degree of registration between the transverse passage in said body and the inlet and outlet in the casing.

6. An air regulating valve for glass drawing and blowing machines comprising a casing provided with an inlet and an outlet and having a bore extending transversely thereto, a valve body longitudinally movable in said casing bore transversely to said inlet and outlet and provided with a transverse passage therethrough, said passage extending longitudinally of said valve body and being of uniform width from end to end and arranged to be brought into greater or lesser register with said inlet and outlet, means for moving said body longitudinally in said casing, and a graduated rod secured to said body and projecting outside of said casing.

7. An air regulating valve for glass drawing and blowing machines comprising a casing provided with oppositely disposed inlet and outlet and with a bore or chamber extending transversely thereto, a valve body longitudinally movable in said bore or chamber and arranged to intercept said inlet and outlet more or less by its movement transversely thereof, said inlet and outlet and valve body providing a passage between the inlet and outlet arranged longitudinally of the line of movement of said body and being of uniform width from end to end, and threaded means for uniformly and gradually moving said body to intercept more or less the passage through said valve.

8. An air regulating valve for glass drawing and blowing machines comprising a casing provided with oppositely disposed inlet and outlet and with a bore or chamber extending transversely thereto, a valve body longitudinally movable in said bore or chamber and arranged to intercept said inlet and outlet more or less by its movement transversely thereof, said inlet and outlet and valve body providing a passage between the inlet and outlet arranged longitudinally of the line of movement of said body and being of uniform width from end to end, threaded means for uniformly and gradually moving said body to intercept more or less the passage through said valve, and a graduated rod connected to said body and projecting outside of said casing.

In testimony whereof, I have hereunto set my hand.

WILLIAM E. STANDLEY.

Witnesses:
GLENN H. LERESCHE,
WILLIAM B. WHARTON.